Mar. 20, 1923.
J. L. HART.
COTTON MACHINERY.
FILED MAY 19, 1920.
1,449,284.
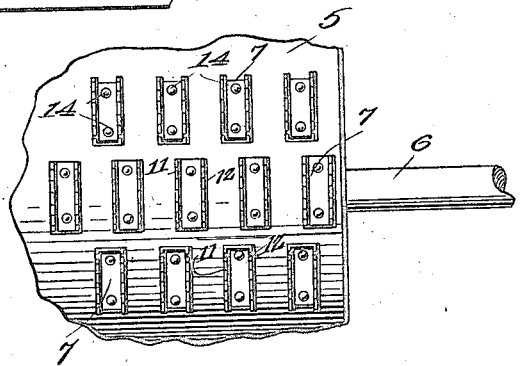
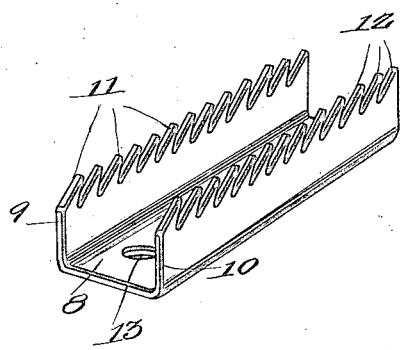
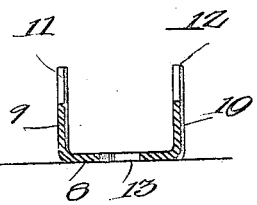
INVENTOR
J. L. HART,
BY
ATTORNEYS
WITNESSES Patented Mar. 20, 1923.

1,449,284

UNITED STATES PATENT OFFICE.

JOSEPH LUTHER HART, OF CHICKASHA, OKLAHOMA.

COTTON MACHINERY.

Application filed May 19, 1920. Serial No. 382,461.

*To all whom it may concern:*

Be it known that I, JOSEPH LUTHER HART, a citizen of the United States, and a resident of Chickasha, in the county of Grady and State of Oklahoma, have invented certain new and useful Improvements in Cotton Machinery, of which the following is a specification.

This invention relates to cotton machinery, and more particularly to an improved saw adapted to be employed in the manufacture of cotton to separate the cotton from the other substances with which it is associated, such as the hulls, seeds or foreign matter.

The object of the invention is to provide a device of this character of simple, durable and economical construction, efficient and reliable in operation and comparatively easy and inexpensive to manufacture.

Other objects and advantages reside in certain novel features of construction, combination and arrangement of parts which will be hereinafter more fully described and particularly pointed out in the appended claims, reference being had to the accompanying drawings forming a part of this specification, and in which, Figure 1 is a side elevational view of a fragment of a saw cylinder embodying my invention;

Figure 2 is a detail perspective view of my improved saw; and

Figure 3 is a transverse vertical section thereof.

Referring to the drawings, especially to Figure 1, it will be seen the invention contemplates a saw cylinder or roll 5 which is mounted upon the shaft 6 and constrained to rotate with the shaft. A plurality of saws, indicated generally at 7, are arranged upon the periphery of the cylinder. The saws are preferably arranged in transverse rows which extend longitudinally of the cylinder, the saws of each row being staggered with respect to the saws of the adjacent row, as shown in Figure 1.

Each of the saws 7 are preferably constructed of a single piece of metal which is made to form a base 8 having spaced side flanges 9 and 10 upstanding therefrom. The upper edges of each of the flanges carry a plurality of saw teeth which are indicated at 11 on the flange 9 and at 12 on the flange 10. The base 8 of the saw is provided with a number of apertures 13 which cooperate with the fastening means 14 to secure the saws to the periphery of the cylinder 5. As shown in the drawings, the saws are channel-shaped or U-shaped in cross section and have a substantial lineal extent and, as may be seen in Figure 1, are arranged to lie circumferentially of the cylinder, and this together with the staggered feature of arrangement provide for a very effective action. It is to be noted that the channel defined by the flanges 9 and 10 and the base 8 necessarily also extends circumferentially of the cylinder.

By referring to Figure 1 it will be seen that this peculiar staggered relation results in the saw teeth of one flange of the saws of one row being disposed opposite the space between the saws of the adjacent rows and the saw teeth of the other flange of the saws of the first-mentioned row being disposed opposite the channel of the saws of said adjacent rows. Consequently, therefore, the saws of the adjacent rows slightly overlap so that the saw teeth of one flange of the saws of one row may be said to be in alinement with the space between the saws of the adjacent row and the saw teeth of the other flange of the saws of the first-mentioned row may be said to be in alinement with the channel of the saws of the adjacent row.

As hereinabove pointed out, the saw is preferably U or channel shaped but it is to be understood that the invention contemplates a saw having a base from which a plurality of flanges are formed and project, the outer edges of the flanges carrying saw teeth and that the invention is not confined to the U-shaped or channel construction which, however, in itself is preferred and presents many advantages.

I claim:

1. A saw for use with cotton machinery comprising a cylinder and a plurality of saws carried by the periphery of the cylinder, the saws being arranged in rows extending longitudinally of the cylinder and the saws of each row being staggered with respect to the saws of the adjacent rows and each of said saws being of elongated channel-shaped construction and comprising an elongated base secured to the cylinder and spaced elongated side flanges integrally formed with the base and provided with saw teeth at their outer edges.

2. A saw for use with cotton machinery constructed of a single piece of metal and comprising an elongated channel shaped construction including an elongated base provided with openings adapted to receive securing means and spaced elongated side flanges upstanding from said base and integral therewith, said side flanges being provided at their outer edges with saw teeth.

3. A saw for use with cotton machinery comprising a cylinder and a plurality of saws carried on the periphery thereof, the saws being arranged in rows extending longitudinally of the cylinder and each of the saws comprising a channel-shaped construction having a base and spaced side flanges extending circumferentially of the cylinder, the side flanges being provided with saw teeth at their outer edges, the saw teeth of one flange of the saws of one row being disposed opposite the space between the saws of the adjacent rows and the saw teeth of the other flange of the saws of the first mentioned row being disposed opposite the channel of the saws of said adjacent rows.

JOSEPH LUTHER HART.